United States Patent Office 3,079,550
Patented Feb. 26, 1963

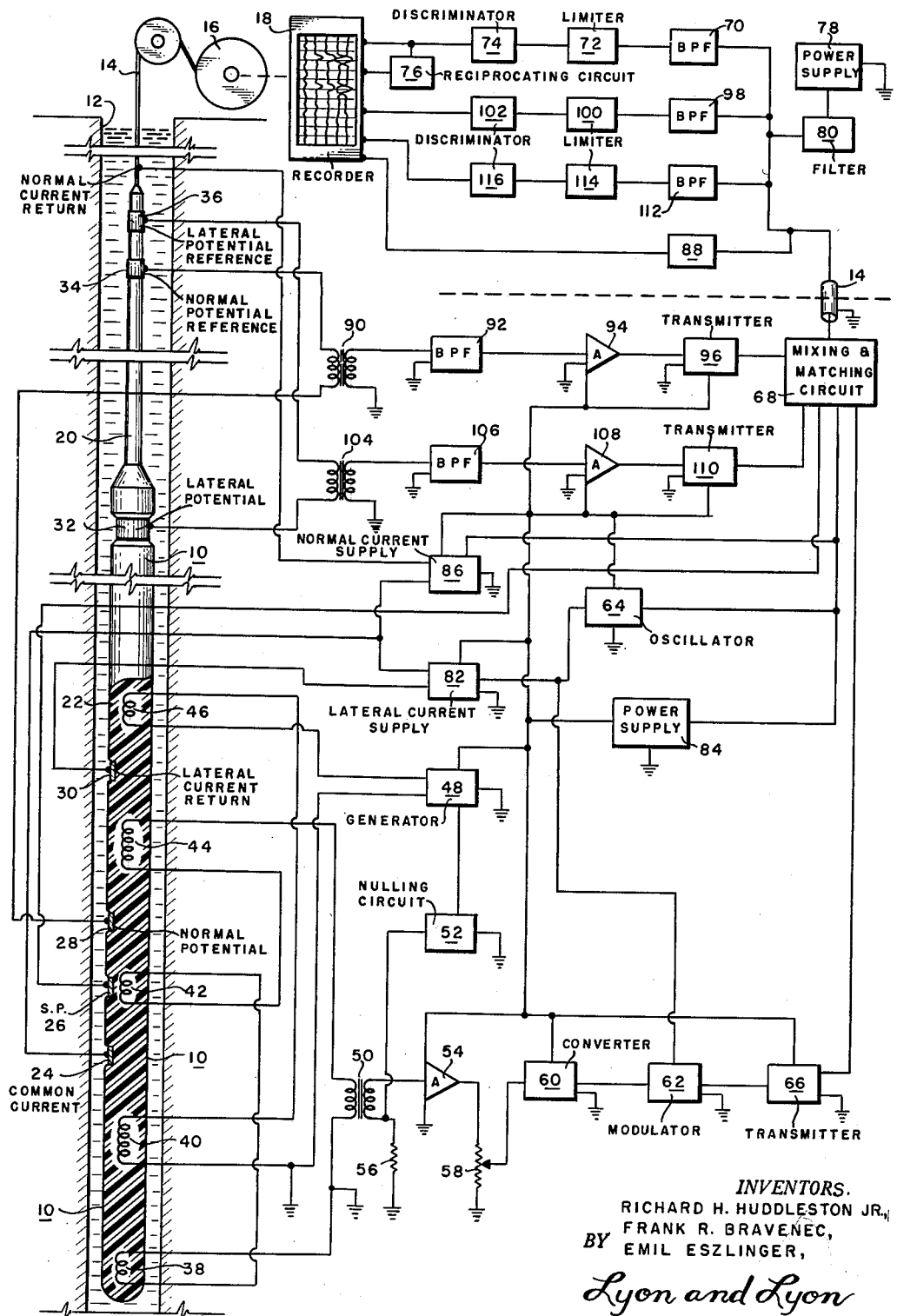

3,079,550
ELECTRICAL WELL LOGGING SYSTEM
Richard H. Huddleston, Jr., Frank R. Bravenec, and Emil Eszlinger, Houston, Tex., assignors to Halliburton Company, a corporation of Delaware
Filed Oct. 24, 1958, Ser. No. 769,333
10 Claims. (Cl. 324—1)

This invention generally relates to the measurement of electrical characteristics of earth formations traversed by a well bore and more particularly relates to a new and improved system for obtaining and logging such measurement.

One type of electrical resistivity measurement of surrounding earth formations is presently made by lowering an energized current electrode, having a remote current return, into the well bore in conjunction with a spaced apart potential electrode having a remote potential reference. The volume of formation effectively influencing this measurement for homogeneous formations is currently considered to be a sphere of radius approximately twice the spacing between the current and the potential electrodes. Thus, by provision of increased spacing between the current and the potential electrodes, an increased volume of surrounding formation may be taken into consideration. This type of resistivity measurement is termed a "normal" resistivity measurement.

Another type of electrical resistivity measurement of the earth formation is presently made by lowering an energized current electrode, having a remote current return, in conjunction with two potential electrodes in spaced apart relation with the current electrode and to one another. The potential then measured between the potential electrodes is indicative of the electrical resistivity of a spherical volume of earth currently considered to be of radius approximately the distance between the current electrode and a midpoint between the potential electrodes. By reciprocity of course, the potential electrodes may be provided as current electrodes, the current electrode and the remote return then serving as the potential electrode with a remote potential reference, to attain this same measurement of resistivity. This type of measurement is generally termed a "lateral" resistivity measurement.

The apparent electrical resistivities of the volumes of earth included in these measurements are influenced by diverse conductivity of the drilling fluid and invasion of drilling mud fluid filtrate into adjacent formations, such influence becoming increasingly predominate as the spacing between the electrodes is reduced. The potentials measured are therefore used as an interpretative rather than absolute guide in recognizing shale, brine, oil or other types of formation. The above mentioned lateral and normal measurements have been found to be complementary in such interpretation. The natural or spontaneous potential existing between the various points in the well bore and the earth's surface is also a valuable interpretative aid in determining the nature of respective formation. Inclusion of this measurement in the recorded well log is of further valuable assistance in interpretation.

A further type of electrical measurement of the surrounding earth formation is presently made by measurement of the electrical eddy currents induced in the surrounding formation by a regular alternating magnetic field. If two coils, designated as a generator coil and a receiver coil, are supported in spaced apart axial relation and the generator coil is excited by an alternating current when immersed in a conductive medium, the generated flux field will produce eddy currents in the medium having paths concentric with the generator coil. These eddy currents will produce a secondary flux field which induces a voltage in the receiver coil which will be at 180° with respect to the generator coil current. At such time as the generated flux field remains of constant magnitude, this 180° voltage will be a direct indication of the conductivity of the surrounding medium.

A log of this conductivity indicating voltage, taken in reference to the above mentioned lateral and normal potential measurements, is found additionally valuable in the log interpretation.

To individually measure each of these types of measurements would require expensive separate trips through the well bore. Further, due to the stretch of well logging cables and slight variations in depth measurement, the log taken at one trip through the well bore may not have the exact depth reference as the next or other logs. It is therefore extremely desirable to have these logs taken at a common depth reference and during a single trip through the well bore.

To attain these measurements directly at the earth's surface it is seen that a logging cable provided between a well logging tool and the earth's surface would need many conductors, requiring a larger, heavier, and more expensive logging cable which is more prone to wear and failure. Further, since the currents supplied through the current electrodes is preferably alternating to eliminate the direct current influence, and the current to the generator coil must necessarily be alternating, the coupling effects between the various conductors of a multiple conductor logging cable presents a serious problem in receiving accurate indications.

It is accordingly the general object of this invention to provide apparatus with which the various above mentioned measurements may be taken and accurately transmitted over a single conductor logging cable to the earth's surface for concurrent indication and recording.

It is a further object of the present invention to provide apparatus by which the various measurements may be taken without mutual influence of one to the other.

Briefly described, these and other objects of the invention are attained by apparatus including an electromagnetic flux generator group including at least one generator coil disposed along a tool body in spaced apart relation to a receiver coil group including at least one receiver coil. At least one current electrode means is disposed on the body for passing a current flow through earth formations about the body. At least one potential electrode is disposed in spaced relation with the current electrode means. A matching circuit is disposed in the body for receiving alternating current power voltage into the body through a conductor of a well logging cable and for impressing signals of respective frequencies which may include a direct current signal on the conductor. A spontaneous potential electrode may be disposed on the body and connected with the matching circuit for impressing a spontaneous potential signal on the conductor. A voltage means is connected with the matching circuit for producing a voltage of first frequency. A first current producing means is connected with the generator group for producing a constant alternating current through the generator group. A second alternating current producing means is connected with the voltage means and the current electrode means for producing a formation current flow. A first receiver means is connected to the receiver group for receiving a composite voltage induced in the receiver group by both the flux directly produced by the generator group and the flux secondarily produced by eddy currents which are induced by the generator group flux in the formations. A voltage nulling means may be connected between the first current producing means and the first receiver means for selectively nulling respective components of the induced composite voltage. A converter means is connected with the first receiver means for converting a resultant induced receiver voltage into a direct current voltage. A modulating means is connected to the voltage means and the converter means to produce a sub-carrier modulating signal of the first frequency representative of the resultant induced receiver voltage. A first frequency modulated transmitter is connected with the modulating means and the matching circuit for impressing a frequency modulated signal on the conductor representative of the resultant voltage. A second receiver means is connected to the potential electrode and a potential reference for receiving a potential produced by the formation current flow. R second frequency modulated transmitter means is connected to the second receiver means, and the matching circuit for impressing a frequency modulated signal on the conductor which is representative of the normal potential. At the earth's surface a power voltage supply means is connected to the conductor for impressing a power voltage through the conductor to the matching circuit. A first receiving and demodulating means is connected to the conductor for receiving and demodulating the first transmitted signal. A reciprocal voltage means may be connected to the first demodulating means for producing a signal which is the reciprocal of the first demodulated signal. A second receiving and demodulating means is connected to the conductor for receiving and demodulating the second transmitted signal. A receiving means may be connected to the conductor for receiving the spontaneous potential signal. A recording means is provided to concurrently record the above signals as a function of the depth of the logging tool within the well bore.

Further objects and advantages of the invention will become apparent from the following description taken in conjunction with the accompanying drawing, in which the FIGURE is a schematic illustration of a logging system constructed according to the invention.

Now referring to the figure, there is illustrated a logging tool including a body 10 suspended in a well bore 12 from a logging cable 14. A hoisting means 16 is provided in connection with cable 14 at the earth's surface to raise and lower body 10 as required. In responsive connection with hoist 16 is a recorder means 18, adapted to receive and record the signals received from body 10 in correlation with the depth of the tool in the bore. Connected above body 10 to electrically isolate a portion of cable 14 from the well fluids is an insulating sheath 20. Connected to the lower end of body 10 is an elongated probe 22.

Mounted within probe 22 in insulated relation to one another are a plurality of coils each having electrical connection into body 10. Mounted on probe 22 in insulated relation to one another are a plurality of current and potential electrodes, each adapted for electrical communication with the conductive drilling fluids and each having electrical connection into body 10. Though the electrodes are shown linearly disposed along the side of probe 22 for illustration, such electrodes may be helically disposed about the surface of probe 22 in order to minimize directional effects.

Beginning at the bottom of the tool, the electrodes shown are a common formation current electrode 24, a spontaneous potential electrode 26, a short spaced normal potential electrode 28, a lateral current return electrode 30 and a lateral potential electrode 32. Mounted at the upper end of sheath 20 in electrical connection into tool 10 are a normal potential reference electrode 34 and a lateral reference potential electrode 36.

As disclosed, the potential measurement taken between lateral electrode 32 and reference electrode 36 results from a current flowing through the surrounding formation between common current electrode 24 and lateral current electrode 30. The potential measurement made between normal electrode 28 and the normal reference electrode 34 results from another current passing through the surrounding formation between common current electrode 24 and the grounded sheath of cable 14. Continuous detection is made of the spontaneous potential developed between electrode 26 and the earth's surface.

Beginning at the bottom of the probe 22, the coils shown are an auxiliary receiver coil 38, a generator coil 40, an auxiliary receiver coil 42, a receiver coil 44 and an auxiliary generator coil 46. The net voltage induced in receiver coils 38, 42 and 44 is measured as being representative of the surrounding formation conductivity.

Illustrated at the right of the figure are the power and detection circuits of the present invention. In actual tools the circuits shown are contained within tool 10.

As previously mentioned, if the generator and receiver coil or coils are immersed in a conductive medium, the generated flux field produces eddy currents in the medium having paths concentric with the generator coil. These eddy currents produce a secondary flux field which in turn induces the 180° voltage in the receiver coil or coils. Also, a voltage will be directly induced in the receiver coil or coils by the primary flux field induced by the generator coil. This directly induced voltage will be in quadrature phase relation with respect to the generator coil current. A composite voltage is thus induced in the receiver coil which, being a vector summation, will have phase characteristics determined by the relative magnitudes of such directly and secondarily induced component voltages.

In theory the directly induced quadrature voltage may be reduced to zero by provision of another auxiliary coil or coils connected in series opposition with either the transmitter or receiver coil and provided of proper turns and spacing relative to the other coils. When so connected the auxiliary generator coil or coils produces a magnetic field in opposition to the main generator coil, effectively nulling the quadrature voltage induced in the receiver coil. By reciprocity the quadrature voltage induced in the main receiver coil will be nulled by that of an auxiliary series opposing receiver coil or coils.

Also, by virtue of the diverse spacing and positions of the coils, the eddy currents induced in some zones of a surrounding conductive medium are more influential on one of the coils than the other. Since the coils are connected in series opposition, any signal from a zone having common influence on both coils of a pair will be nulled and this zone will have little net effect on the resulting signal. If the conductive medium is a well bore filled with conductive drilling mud the effects of the drilling mud may thus be minimized and the 180° voltage component induced in the receiver coil will be more nearly responsive to the true conductivity of the more remote surrounding formation. Early application of this theory is disclosed in Patent No. 2,220,070 to Aiken.

As previously mentioned, the system may be provided with a generator group having one or more generator coils and a receiver group having one or more receiver coils as desired to minimize the conductivity of the bore hole fluids and/or to emphasize the conductivity of well formations in selective zones about and away from the bore hole. The spacing between generator coil 40 and receiver coil 44 may vary, for example, from 25 to 50 inches. The spacings of auxiliary coils 38, 42 and 46 will also vary depending on their respective number of turns and depending on the results desired. An array having two transmitter coils and three receiver coils is herein illustrated by example only. Arrays may be provided having two, three, four, five or more coils respectively.

The coils are fabricated into the cylindrical probe assembly 22 which is constructed of insulating and non-magnetic material such as glass cloth, epoxy resins, neoprene, rubber, etc. The electrodes 24, 26, 28 and 30 are also of some non-magnetic material such as brass or carbon, for example. The electrodes are mounted in the surface of the probe 22 in such relation as to present a conductive face to the surounding well bore fluids. In an actual practice electrical connection to the electrodes is made from the housing 10 through the material of probe 22 of each electrode. Likewise, electrical connection from the coils is made through the probe 22 into tool 10.

As shown, the generator coils 40 and 46 are connected in series opposing and connected into a constant current generating circuit 48. Generator coils 40 and 46 provide the inductance for a series resonant circuit of desired operating frequency, 20 kc. for example, and also serve as the load impedance for generating circuit 48. Generator 48 functions to provide a constant current through coils 40 and 46, producing a constant alternating electromagnetic flux field in the surrounding formation. The fields porduced by generator coils 40 and 46 produce eddy currents in the surrounding formation which are concentric about the axis of the coils. For further description of generating circuit 48, reference may be had to the copending and commonly assigned application to Richard H. Huddleston, Jr., entitled "Constant Electromagnetic Field Well Logging System," Serial No. 614,196, filed October 5, 1956, and now Patent No. 2,928,039.

The auxiliary receiver coils 38 and 42 are connected, with respect to generator coil 40, in series opposed relation with receiver coil 44 and are connected in series with the primary of a receiver input transformer 50, one terminal of which is connected to ground.

While in theory the turns and spacing of the generator and receiver coils can be provided to create no directly induced quadrature voltage in the receiver coil or coils, it has been found in practice, due to physical manufacturing tolerances and various electrical effects, that a residual spurious signal will remain which is not nulled solely by the foregoing method. Because of these effects encountered in actual manufacture of the coil array, the residual signal is actually a complex quantity, having a quadrature component and a 180° component.

Connected between generator circuit 48 and the secondary of input transformer 50 is a null adjustment circuit 52, provided to null the undesirable induced voltages previously described. The nulling circuit 52 respectively provides both in-phase and quadrature voltage nulling adjustment. The secondary of transformer 50 is connected into linear amplifier 54 and through a resistor 56 to ground. The output of nulling circuit 52 is connected through resistor 56 to ground. The internal impedance of nulling circuit 52 is very high relative to the resistance of resistor 56, causing resistor 56 to function as a current summing device.

Amplifier 54 is connected through an attenuating potentiometer 58 into a linear converter amplifier 60. The output of converter 60 is a direct current voltage. The primary function of potentiometer 58 is to provide sensitivity and range adjustments. The output of amplifier 60 is connected into an alternating current modulator 62. Modulator 62 is driven by an oscillator 64 at a frequency of 200 cycles, for example. Modulator 62 converts the direct current voltage into a 200 cycle sub-carrier modulating voltage. The output of modulator 62 is connected into a frequency modulated carrier oscillator 66 to provide a modulating signal for the oscillator. Oscillator 66, usually termed a transmitter, may be of selected center frequency, for example, 10.5 kc. The frequency modulated signal is then impressed on the conductor of cable 14 through a mixing and matching circuit 68 for transmission to the earth's surface.

The 10.5 kc. modulated signal impressed on the conductor of cable 14 is received at the surface through a band pass filter 70 to a limiting circuit 72. The output of limiting circuit 72 is connected into a discriminator circuit 74. Discriminator 74 may be of the type used in frequency modulation radio reception. Its purpose is to demodulate the frequency modulated signal into a 200 cycle amplitude modulated signal corresponding to the output of modulator 62. The output of discriminator 74 is connected into a suitable meter circuit contained within recorder 18 and recorded as a representation of the conductivity of the earth formation surrounding probe 22. For further description of such demodulation and recording apparatus, reference may be had to Patent No. 2,573,133 to Greer.

Since a resistivity indication of the measurement made by the induction array is usually desired, the output signal from discriminator 74 may be connected into a voltage reciprocating circuit 76. The output signal from circuit 76 is a reciprocal of the signal from demodulator 76 which is representative of the formation resistivity. This reciprocal signal is connected into suitable metering circuits within recorder 18 and recorded.

An alternating current power supply 78, at 400 cycles for example, is connected through a filter 80 and the conductor of cable 14 into matching circuit 68. From matching circuit 68 the power voltage is connected into 200 cycle oscillator 64, a 133 cycle normal formation supply 86, and a direct current power supply 84. The oscillator 64 may be a conventional multivibrator of character such that the 400 cycle voltage serves as a frequency dividing synchronizing voltage. Formation supply circuit 82, in response to the 200 cycle voltage from oscillator 64 and direct current voltage from supply 84, produces a constant 200 cycle lateral formation supply current.

Formation supply circuit 86 includes a multivibrator synchronized at 133 cycles by the 400 cycle power voltage which drives a current supply circuit similar to supply circuit 82.

The output of the 200 cycle lateral formation supply 82 is connected to common current electrode 24 and lateral current return electrode 30. The output of the 133 cycle normal formation supply 86 is connected to common current electrode 24 and to the sheath of cable 14.

The spontaneous potential electrode 26 is connected through matching circuit 68 and the conductor of cable 14 into a filter circuit 88, provided to exclude A.C. voltages. The D.C. potential from filter 88 is recorded by recorder 18.

The normal potential electrode 28 is connected through the primary of a pickup transformer 90 to the normal reference electrode 34. The secondary of transformer 90 is connected into a band pass filter 92, provided to exclude frequencies other than 133 cycles. The 133 cycle output of filter 92, representative of the normal potential, is connected through an amplifier 94 into a transmitter oscillator 96. The 133 cycle signal serves as a sub-carrier modulating frequency for transmitter oscillator 96 which operates for example, at a center frequency of 8.0 kc. The modulated 8.0 kc. output of oscillator 96 is connected through matching circuit 68 and the cable conductor to a band pass filter 98. Band pass filter 98 is connected through a limiter 100 into a discriminator 102 which functions to demodulate the 8.0 kc. frequency as previously described for discriminator 74. The output of discriminator 102 is connected into metering circuits within recorder 18 and recorded.

The lateral potential electrode 32 is connected through the primary of a pickup transformer 104 to the lateral reference electrode 36. The secondary of transformer 104 is connected through a band pass filter 106. The 200 cycle output of band pass filter 106 is amplified by an amplifier 108 and connected into a transmitter oscillator 110 which has a center frequency of 14 kc. for example. The 200 cycle voltage, which is of amplitude representative of the lateral potential, serves as a sub-carrier modulating frequency for oscillator 110. The output of oscillator 110 is connected through matching circuit 68 and the cable conductor into a band pass filter 112. Filter 112 is connected through a limiter 114 into a discriminator 116. Discriminator 116 functions as previously described for discriminator 74 and its output is connected into metering circuits of recorder 18 and recorded. The various filters, amplifiers, oscillators designated herein are generally of conventional nature unless otherwise specified and may be provided as suitable.

In operation the tool is usually lowered to the bottom of the well and the log of the measurements taken on the upper trip through the well bore. As the tool travels upwardly through the bore, the 400 cycle power from supply 78 synchronizes oscillator 64 to produce a 200 cycle frequency and also synchronizes the oscillator of 86 to produce a 133 cycle frequency. The power supply 84 supplies direct current voltage to amplifiers 94 and 108, transmitter oscillators 96 and 110, supply circuits 86 and 82, oscillator 64, generating circuit 48, amplifiers 54 and 60 and transmitter oscillator 66.

The net voltage induced in the receiver coils 38, 42 and 44 is impressed on the primary of transformer 50. The nulling voltage as required from circuit 52 is summed across resistor 56 with the voltage appearing in the secondary of transformer 50 and the resultant voltage is fed into amplifier 54. The output of amplifier 54 is converted to a direct current voltage by converter 60 and then into a 200 cycle alternating voltage by modulator 62 which is of amplitude representative of the induced voltage. Oscillator 66 is modulated from its center frequency by the 200 cycle modulating voltage and transmits a frequency modulated signal through the conductor of cable 14 to the earth's surface to be demodulated into a 200 cycle voltage for subsequent recording as an indication of the net induced voltage at the receiver coil. As previously mentioned, this voltage may be recorded directly as indication of the formation conductivity and a reciprocal of this voltage may also be recorded as the resistivity of the surrounding formation.

The potential occurring at normal potential electrode 28 is picked up at transformer 90, filtered and amplified to serve as a modulating voltage for oscillator 96. The output of oscillator 96, an 8.0 kc. frequency modulated at 133 cycles, is transmitted through the conductor of cable 14, filter 98, limiter 100 and discriminated into a 133 cycle voltage at discriminator 102 for subsequent recording as an indication of the normal resistivity.

The lateral potential at the lateral electrode 32 is picked up through transformer 104, filtered at 106, amplified at 108 and fed into oscillator 110 as a modulating frequency of 200 cycles. The output of oscillator 110, at a center frequency of 14.0 kc. modulated at 200 cycles, is transmitted through the conductor of cable 14, filter 112, limiter 114 and discriminated by discriminator 116 into a 200 cycle voltage of amplitude representative of the lateral potential for subsequent recording.

By mechanical or electrical connection, such as a "Selsyn" drive, recorder 18 is driven in proportion to the passage of tool 10 through the well bore. Thus, the log recorded of the various measurements taken as the tool moves through the well bore is representative of the resistivity of the earth formation at the various depths within the bore.

The spontaneous potential occurring between the electrode 26 and the earth's surface is continually impressed through filter 88 and concurrently recorded with the previously desribed potentials.

It is to be understood that the embodiment disclosed is by way of illustration only and alternate embodiments will become apparent to those skilled in this art. The invention is intended therefore not to be limited thereby but to include all modifications coming within the definition of the depended claims.

That being claimed is:

1. Electrical well logging apparatus comprising, an electromagnetic flux generator group including at least one generator coil disposed with respect to a tool body in spaced apart relation to a receiver coil group including at least one receiver coil, a lateral current electrode means disposed on said body for passing a first lateral current flow through earth formations about said body, a normal current electrode means disposed on said body for passing a second normal current flow through said formations, at least one normal potential electrode disposed in spaced apart relation to said normal current means, at least one lateral potential electrode disposed in spaced apart relation to said lateral current means, matching means for receiving alternating current power voltage into said body through a conductor of a well logging cable and jointly impressing signals of respective frequencies with a spontaneous potential signal on said conductor, a spontaneous potential electrode disposed on said body and in connection with said matching means, a first voltage means connected with said matching means for producing a direct current voltage, a second voltage means connected with said matching means and said first voltage means for producing a voltage of first frequency, a third voltage means connected with said matching means and said first voltage means for producing a voltage of second frequency, a means connected with said first voltage means and said generator group for producing a constant alternating current through said generator group, a means connected with said first voltage means, said second voltage means, and said lateral electrode means for producing said first formation current flow, means connected to said first voltage means, said third voltage means, and said normal current electrode means for producing said second formation current flow, a first receiver means connected to said receiver group for receiving the composite voltage induced in said receiver group by the flux directly produced by said generator group and the flux secondarily produced by eddy currents induced by said generator group flux in said formations, nulling means connected between said constant current means and said receiver means for selectively nulling respective components of said composite voltage, means connected to said receiver means and said first voltage means for converting a resultant received voltage into a direct current voltage, modulating means connected to said second voltage means and said converter means to produce a sub-carrier modulating signal of said first frequency and representative of said resultant voltage, a first frequency modulated transmitter means connected to said first voltage means, said modulation means and said matching section for impressing a frequency modulated first signal on said conductor representative of said resultant voltage, a second receiver means connected to said normal potential electrode and a remote potential reference for receiving a potential produced only by second normal current, a second frequency modulated transmitter means connected to said second receiver means, said first voltage means and said matching section for impressing a second frequency modulated signal on said conductor representative of said normal potential, a third receiver means connected to said lateral potential electrode and a remote potential reference for receiving a potential produced only by said first lateral current, a third frequency modulated transmitter means connected to said third receiver means, said first voltage means and said matching section for impressing a third frequency modulated signal on said conductor representative of said lateral potential.

2. Electrical well logging apparatus including in combination, an electromagnetic flux generator coil group disposed along a tool body in spaced apart relation to a receiver coil group, a lateral current electrode means for passing a first lateral current flow through earth formations about said body, a normal current electrode means for passing a second normal current flow through said formations, a normal potential electrode, a lateral potential electrode, matching means for receiving alternating current power voltage into said body through a conductor of a well logging cable and for impressing signals of respective frequencies on said conductor, a first voltage means for producing a voltage of first frequency, a second voltage means for producing a voltage of second frequency, a means for producing a constant alternating current through said generator group, a means for producing said first formation current flow, a means for producing said second formation current flow, a first receiver means for receiving a composite voltage induced in said receiver group, nulling means for selectively nulling respective components of said composite voltage, a means for converting a resultant received voltage into a sub-carrier modulating signal of said first frequency and representative of said resultant voltage, a first frequency modulated transmitter means for impressing a first frequency modulated signal on said conductor representative of said resultant voltage, a second receiver means for receiving a potential produced only by said first lateral current flow, a second frequency modulated transmitter means modulated by said second receiver means for impressing a second frequency modulated signal on said conductor representative of said lateral potential, a third receiver means for receiving a potential produced only by said second normal current, and a third frequency modulated transmitter means modulated by said third receiver means for impressing a third frequency modulated signal on said conductor representative of said normal potential.

3. In electrical well logging apparatus, an electromagnetic flux generator group including at least one generator coil disposed in spaced apart relation to a receiver group including at least one receiver coil, a lateral current electrode means for passing a first lateral current flow through earth formations about said body, a normal current electrode means for passing a second normal current flow through said formations, at least one lateral potential electrode, at least one normal potential electrode, matching means for receiving alternating current power voltage into said body through a conductor of a well logging cable and for mixing signals of respective frequencies with a spontaneous potential signal to be impressed on said conductor, a spontaneous potential electrode connected with said matching means, a first voltage means connected with said matching means for producing a voltage of first frequency, a second voltage means connected with said matching means for producing a voltage of second frequency, a means connected with said generator group for producing a constant alternating current through said generator group, a means connected with said first voltage means and said lateral electrode means for producing said first formation current flow, means connected to said second voltage means, and said normal current electrode means for producing said second formation current flow, a first receiver means connected to said receiver group for receiving a composite voltage induced in said receiver group by the flux directly produced by said generator group and the flux in said formation, nulling means connected between said constant current means and said receiver means for selectively nulling respective components of said composite voltage, means connected to said receiver means for converting a resultant received voltage into a direct current voltage, modulating means connected to said converter means for producing a sub-carrier modulating signal of said first frequency and representative of said resultant voltage, a first frequency modulated transmitter means connected to said modulation means and said matching section for impressing a first frequency modulated signal on said conductor representative of said resultant voltage, a second receiver means connected to said normal potential electrode and a remote potential reference for receiving a potential produced only by said second formation current, a second frequency modulated transmitter means connected to said second receiver means and said matching section for impressing a second frequency modulated signal on said conductor representative of said normal potential, a third receiver means connected to said lateral potential electrode and a remote potential reference for receiving a potential produced only by said first formation current, a third frequency modulated transmitter means connected to said third receiver means, and said matching section for impressing a third frequency modulated signal on said conductor representative of said lateral potential.

4. Electrical well logging apparatus comprising; an electromagnetic flux generator group including at least one generator coil disposed along a tool body in spaced apart relation to a receiver coil group including at least one receiver coil; a normal current electrode means disposed on said body for passing a first normal current flow through earth formations about said body; a lateral current electrode means disposed on said body for passing a second lateral current flow through said formations; at least one normal potential electrode disposed in spaced relation to said normal current means; at least one lateral potential electrode disposed in spaced relation to said lateral current means; matching means disposed within said body for receiving alternating current power voltage into said body through a conductor of a well logging cable and for impressing signals of respective frequencies including a direct current signal on said conductor; a spontaneous potential electrode connected with said matching means for impressing on said conductor a spontaneous potential developed in said formations about said body; a first voltage means connected with said matching means for producing a direct current voltage within said body; a second voltage means connected with said matching means and said first voltage means for producing a voltage of first frequency; a third voltage means connected with said matching means and said first voltage means for producing a voltage of second frequency; a first current producing means connected with said first voltage means and said generator group for producing a constant alternating current through said generator group; a second current producing means connected with said first voltage means, said second voltage means, and said normal electrode means for producing said first normal formation current flow; a third current producing mean connected to said first voltage means, said third voltage means, and said lateral current electrode means for producing said second lateral formation current flow; a first receiver means connected to said receiver group for receiving a composite voltage induced in said receiver group by both the flux directly produced by said generator group and the flux secondarily produced by eddy currents induced by said generator group flux in said formation; voltage nulling means connected between said first current producing means and said first receiver means for selectively nulling the respective components of said composite voltage; means connected to said first receiver means and said first voltage means for converting a resultant receiver voltage into a direct current voltage; modulating means connected to said third voltage means and said converter means to produce a sub-carrier modulating signal of said second frequency and representative of said resulting voltage; a first frequency modulated transmitter connected to said first voltage means, said modulation means, and said matching section for impressing a frequency modulated signal on said conductor representative of said resultant voltage; a second receiver means connected to said normal potential electrode and a remote potential reference for receiving a potential produced only by said first normal formation current flow; a second frequency modulated means connected to said second receiver means, said first voltage means, and said matching section for impressing a frequency modulated signal on said conductor representative of said normal potential; a third receiver means connected to said lateral potential electrode and a remote potential reference for receiving a potential produced only by said second lateral formation current flow; a third frequency modulated transmitter means connected to said third receiver means, said first voltage means, and said matching section for impressing a frequency modulated signal on said conductor representative of said lateral potential.

5. The apparatus of claim 4 including means connected to said conductor for impressing said power voltage through said conductor to said matching means; a first means connected to said conductor for receiving and demodulating said first transmitted signal; means connected to said first demodulating means for creating a signal which is the reciprocal of said first demodulated signal; a second means connected to said conductor for receiving and demodulating said second transmitted signal; a third means connected to said conductor for receiving and demodulating said third transmitted signal; means connected to said conductor for receiving said spontaneous potential signal; and means to concurrently record said signals as a function of the depth of said tool within a well bore.

6. The apparatus of claim 4 including means connected to said conductor for impressing said power voltage through said conductor to said matching means; a first means connected to said conductor for receiving and demodulating said first transmitted signal; a second means connected to said conductor for receiving and demodulating said second transmitted signal; a third means connected to said conductor for receiving and demodulating said third transmitted signal; means connected to said conductor for receiving said spontaneous potential signal; and means to concurrently record said signals as a function of the depth of said tool within a well bore.

7. Electrical well logging apparatus comprising: an electromagnetic flux generator group including at least one generator coil disposed along the tool body in spaced apart relation to a receiver coil group including at least one receiver coil; a current electrode means disposed on said body for passing an alternating current flow through earth formations about said body; at least one potential electrode disposed in spaced relation to said current electrode means; matching means disposed within said body for receiving operating power voltage into said body through a conductor of a well logging cable and for impressing signals of respective frequencies on said conductor; a voltage means connected with said matching means for producing a voltage of first frequency; a first current producing means connected with said first said generator group for producing a constant alternating through said generator group; a second current producing means connected with said voltage means and said current electrode means for producing said formation current flow; a first receiver means connected to said receiver group for receiving a composite voltage induced in said receiver group by both the flux directly produced by said generator group and the flux secondarily produced by eddy currents induced by said generator group flux in said formation; voltage nulling means connected between said first current producing means and said first receiver means for selectively nulling the respective components of said composite voltage; means connected to said first receiver means and said voltage means for converting a resultant receiver voltage into a sub-carrier modulating signal of said first frequency and representative of said resultant voltage; a first frequency modulated transmitter connected to said modulation means and said matching section for impressing a first frequency modulated signal on said conductor representative of said resultant voltage; a second receiver means connected to said potential electrode and a remote potential reference for receiving a potential produced by said formation current flow; and a second frequency modulated transmitter modulated by said second receiver means for impressing a second frequency modulated signal on said conductor representative of said potential.

8. The apparatus of claim 7 including means connected to said conductor for impressing said power voltage through said conductor to said matching means; a first means connected to said conductor for receiving and demodulating said first transmitted signal; means connected to said first demodulating means for creating a signal which is the reciprocal of said first demodulated signal; a second means connected to said conductor for receiving and demodulating said second transmitted signal; and means to concurrently record said signals as a function of the depth of said tool within a well bore.

9. The apparatus of claim 7 including means connected to said conductor for impressing said power voltage through said conductor to said matching means; a first means connected to said conductor for receiving and demodulating said first transmitted signal; a second means connected to said conductor for receiving and demodulating said second transmitted signal; and means to concurrently record said signals as a function of the depth of said tool within a well bore.

10. In electrical well logging apparatus comprising, an electromagnetic flux generator coil disposed along a tool body in spaced apart relation to a receiver coil, a matching means for receiving alternating current power voltage into said body through a conductor of a well logging cable and for impressing signals of respective frequencies including a direct current signal on said conductor, a means for producing a constant alternating current through said generator coil, a means for producing a first normal formation current flow through earth formations about said body, a means for producing a second lateral formation current flow through said earth formations, a first receiver means for receiving the composite voltage induced in said receiver coil, a nulling means for selectively nulling respective components of said composite voltage, means for converting a resultant induced voltage into a sub-carrier modulating signal representative of said resultant voltage, a first frequency modulated transmitter means for impressing a first frequency modulated signal on said conductor representative of said resultant voltage, a second receiver means for receiving a potential produced only by said first normal current flow, a second frequency modulated transmitter means modulated by said second receiver means for impressing a second frequency modulated signal on said conductor representative of said normal potential, a third receiver means for receiving a potential produced only by said second lateral current flow, a third frequency modulated transmitter means modulated by said third receiver means for impressing a third frequency modulated signal on said conductor representative of said lateral potential, and means to impress a direct current spontaneous potential signal developed in said earth formations on said conductor.

References Cited in the file of this patent

UNITED STATES PATENTS

| | | |
|---|---|---|
| 2,573,133 | Greer | Oct. 30, 1951 |
| 2,573,137 | Greer | Oct. 30, 1951 |
| 2,617,852 | Waters | Nov. 11, 1952 |
| 2,838,730 | Lebourg | June 10, 1958 |
| 2,928,038 | Huddleston | Mar. 8, 1960 |
| 2,928,039 | Huddleston | Mar. 8, 1960 |

OTHER REFERENCES

Petroleum Transactions AIME, July 1957, TP 4610. Article by Dumanoir et al.